United States Patent
Kheradpir

[11] Patent Number: 5,414,956
[45] Date of Patent: May 16, 1995

[54] INTERLOCKING GARDEN EDGING AND ORNAMENT

[76] Inventor: Kamyar Kheradpir, P.O. Box 401, Greenville, N.C. 27835-0401

[21] Appl. No.: 202,257

[22] Filed: Feb. 25, 1994

[51] Int. Cl.⁶ ............................................. A01G 1/00
[52] U.S. Cl. .............................................. 47/33; 404/41
[58] Field of Search ................. 47/33; 404/41, 7, 8; 52/702

[56] References Cited

U.S. PATENT DOCUMENTS

| | | | |
|---|---|---|---|
| 352,146 | 11/1886 | Oungst | 47/33 |
| 1,916,494 | 7/1933 | Schrickel | 47/33 |
| 2,877,600 | 3/1959 | Slate | 47/33 |
| 3,015,448 | 1/1962 | Hurless | 47/25 |
| 3,277,606 | 10/1966 | Cohen | 47/33 |
| 3,520,082 | 7/1970 | Smith | 47/33 |
| 3,724,128 | 4/1973 | Tabone | 47/33 |
| 4,831,776 | 5/1989 | Fritch | 47/33 |

FOREIGN PATENT DOCUMENTS

| | | | |
|---|---|---|---|
| 563835 | 11/1932 | German Dem. Rep. | 404/41 |
| 182709 | 3/1963 | Sweden | 404/7 |
| 241403 | 10/1925 | United Kingdom | 404/41 |

*Primary Examiner*—Ramon S. Britts
*Assistant Examiner*—Joanne C. Downs
*Attorney, Agent, or Firm*—Rhodes, Coats & Bennett

[57] ABSTRACT

A molded plastic landscape edging module is adapted to be joined with other modules to form a landscape border. The landscape edging module consists of an elongated, hollow body having two opposed ends. A female connector is formed in one end of the hollow body. A male connector is formed in an opposing end for interlocking with the female connector in another module to join the modules in end-to-end relationship. A pair of longitudinal stabilizing flanges extending outwardly from the sides of the hollow body and extend generally parallel to the ground. The stabilizing flanges are covered by soil when the module is inserted into the ground to stabilize the module.

15 Claims, 5 Drawing Sheets

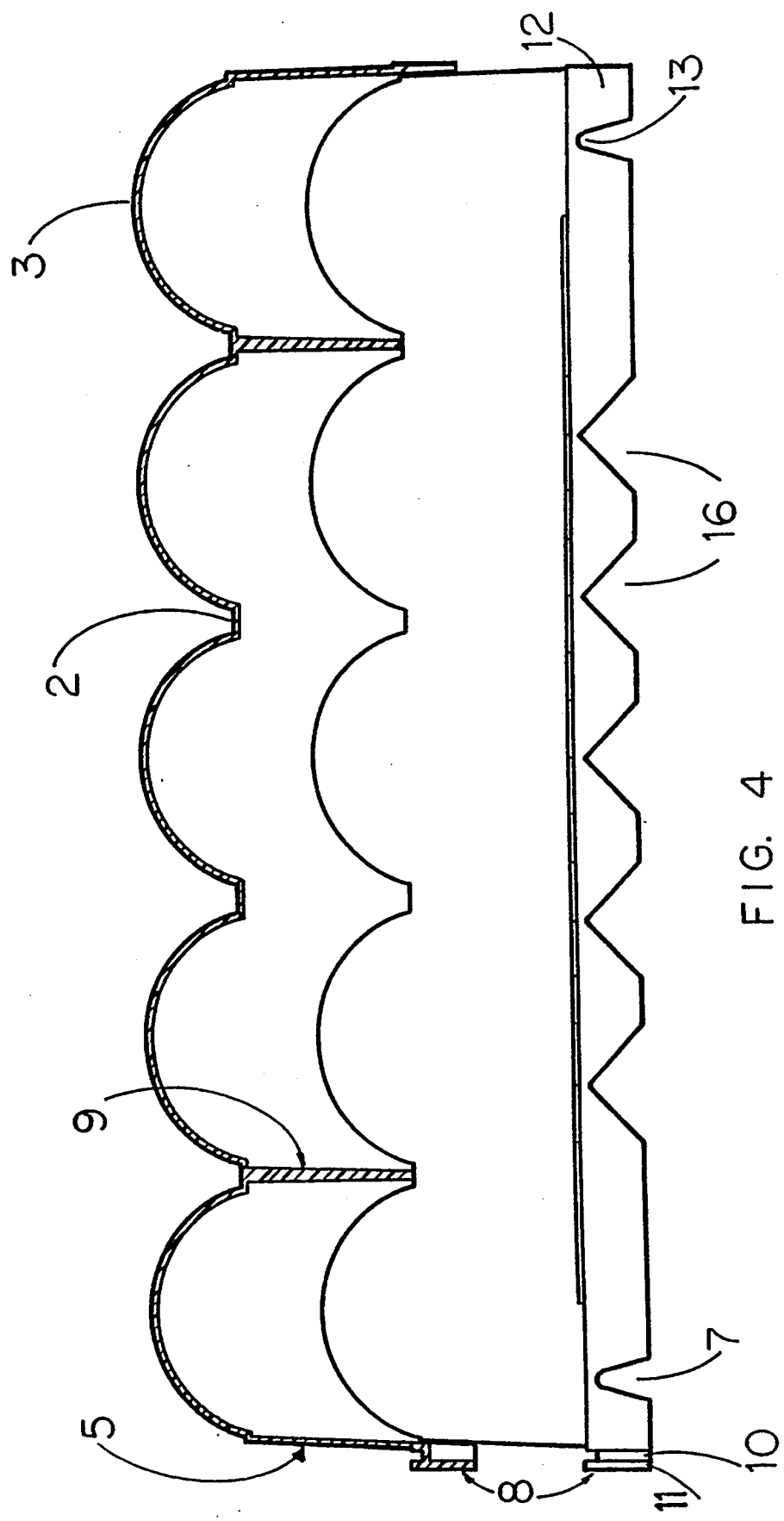

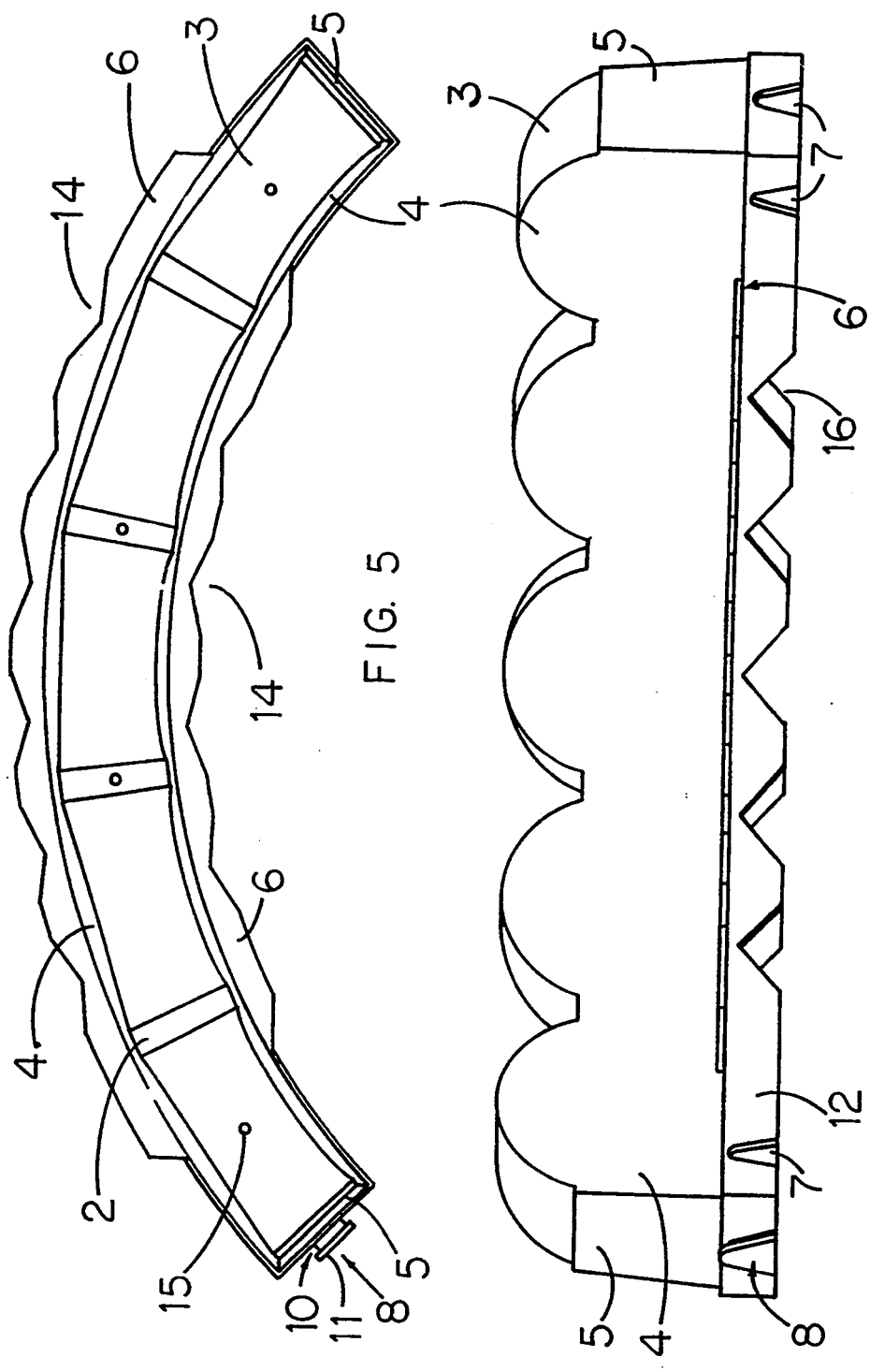

INTERLOCKING GARDEN EDGING AND ORNAMENT

BACKGROUND OF THE INVENTION

1. Field of the Invention

The present invention relates generally to the field of landscaping and particularly to edging devices used to divide the landscape and provide border lines. More particularly the present invention relates to molded plastic landscape edging and ornamentation which simulate concrete or clay structures in texture, appearance, and function, but are more economical to manufacture and distribute to the end user.

2. Description of the Related Technology

In the field of landscaping, division of the terrain is customarily accomplished by utilizing logs of wood, bricks, or concrete devices designed as landscape borders and edgings. Brick and concrete devices last longer than logs of wood against the weather and moisture, however other alternatives have been sought to devices made out of clay or concrete.

Molding landscaping devices out of plastics has advantages over conventional material. Plastics enable the designer to apply fine detail in his work which are not practical with other material. Plastics also provide more uniform products, thus enhancing the ornamental effects of such devices. The use of almost infinite selection of colorants in plastics has given plastic landscaping devices another advantage over the conventional material.

Concrete and clay have a generally higher specific density than that of most plastics used for such devices, and plastic devices are often molded as hollow boxes; for these reasons, plastic devices weigh less than those of conventional material and similar dimensions. The weight difference enables one to save on shipping costs.

Plastic landscaping devices that are specifically designed as garden edging and border products typically depend on the extrusion method of manufacturing, this means that bending the device to an angle or forming it to an arc is not possible and a second device has to be injection molded to function as an angle or an arc.

Plastic edging devices that are molded individually such as U.S. Pat. No. 3,762,113 typically require stakes for anchoring the units to the soil, and brackets and pins for interlocking of two units together. Furthermore additional parts requirement means a larger and more diversified inventory, which in turn may increase the cost of such product.

U.S. Pat. No. 4,074,479 depends on trapezoidal sections. To preserve such shape, thin flanges and clips were devised, complicating the usage and inventory of the parts. The aforementioned invention is designed to be buried in the soil with only its top wall exposed.

U.S. Pat. Nos. 5,119,587, 5,134,817, and 4,986,042 also depend on pins for interlocking and use non-plastic material for their construction. Furthermore none is designed to save shipping volume when units are stacked on the top of each other.

U.S. Pat. No. 5,092,076 also utilizes pins for anchoring but does not address the problem of interconntivity of two adjacent units.

U.S. Pat. No. 5,048,241 does not require the use of anchoring stakes, yet it calls for use of metal and does not provide means of interconnectivity of two units or formation of arcs.

U.S. Pat. Nos. 5,157,867 and 4,969,289 depend on specialty devices to connect two adjacent units together or for anchoring purposes.

There still is opportunity to improve upon the prior art and invention of a garden edging device that is made of plastics, does not require specialty devices for interlocking of two units, or anchoring to the ground, stacks efficiently, and can be used to construct different geometrical shapes including those which use circular arcs.

SUMMARY OF THE INVENTION

The subject invention provides an injection molded plastic substitute for conventional brick or concrete edging devices. Such invention is used as an interface or boundary between two or more regions of terrain. This invention is made in at least two forms, one generally longitudinally straight module and another generally curved module; these modules can be interlocked together to construct linear or curvilinear boundaries.

This invention is molded to shape of a long and narrow box with five walls and one open face. An upper wall which is formed out of multiplicity of flat and cylindrical surfaces is bounded by two side walls and two end walls which are generally vertical to it. A flange which is generally parallel to the upper wall is attached to each side wall. These flanges provide longitudinal mechanical stiffness to the modules as well as stability while they are inserted into the soil. Each module is inserted with its open face directed downward into soil that has been softened or moistened. The flanges are then covered with soil to assure stability against mechanical shocks or buoyancy caused by the flow of water into the soil and the subsequent release of trapped air.

The interlocking mechanism is made out of male and female connectors which are formed onto the side walls of each module. These connectors are devised so that they prevent longitudinal and lateral separation of the modules, yet they provide almost no restriction to vertical motions. The male connector is generally in the form of a triangular prism extending from the bottom of the end wall outwardly with its triangular sides parallel to the plane of the end wall. The utmost triangular side is capped with another triangular plate which has generally larger dimensions. The female connector has the shape of a triangular slot cut into the side walls and one of the end walls.

The shape of the triangular prisms and slots are generally the same so that when the female and male connectors are connected, they provide a generally good mechanical fit. The end plates of the male connectors are generally larger in dimension from the female slots and therefore are captivated on the other side of the wall. This method of interlocking is used to connect individual modules as they are inserted into the soil.

The female connectors are provided for one end wall and both side walls, while there is only one male connector per module and it is located on the other end wall. This combination of connectors allows the user to form different geometric shapes including but not limited to circles, squares, rectangles and a plurality of shapes involving semicircles-circles, arcs and straight lines.

One object of this invention is to provide the user an injection molded plastic garden edging modules that can be interlocked for greater mechanical stability.

Another object of this invention is to manufacture and make available modules with multiplicity of colors which are not available in conventional concrete or brick garden edgings.

A further object of this invention is to provide a lighter weight product than conventional edgings, thus saving on transportation costs. Furthermore the light weight modules provide a more convenient edging to work with, an objective which makes the less able-bodied user more self sufficient when installing garden edgings.

A further object of this invention is to provide an interlocking and stabilizing system which does not require a third piece connectivity such as a pin, a clip or a stake.

A further object of this invention is to design a device that is mechanically self supporting and stable and does not require a third piece of hardware to enhance these properties.

Another object of this invention is to utilize shipping space efficiently by provision of a system of stacking for similar modules.

A further object of this invention is to facilitate demolding of the module during production and prevention of scratches caused by wall to wall contacts during stacking by provision of a draft angle of about two degrees (2°) from vertical to the side walls and end walls.

A further object of this invention is to avoid possible motion due to buoyancy of the modules once the soil is wetted and trapped air is released into the modules, by means of stabilizing flanges and ventilation holes of the upper wall.

BRIEF DESCRIPTION OF THE DRAWINGS

The present invention may be more readily understood from the following detailed description when taken in conjunction with the accompanying drawings in which:

FIG. 4 is a side view of two stacking modules with one of the side walls of the upper module removed.

FIG. 5 is a planar top view of a curved module.

FIG. 6 is a side view of a curved module.

DESCRIPTION OF THE PREFERRED EMBODIMENT

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
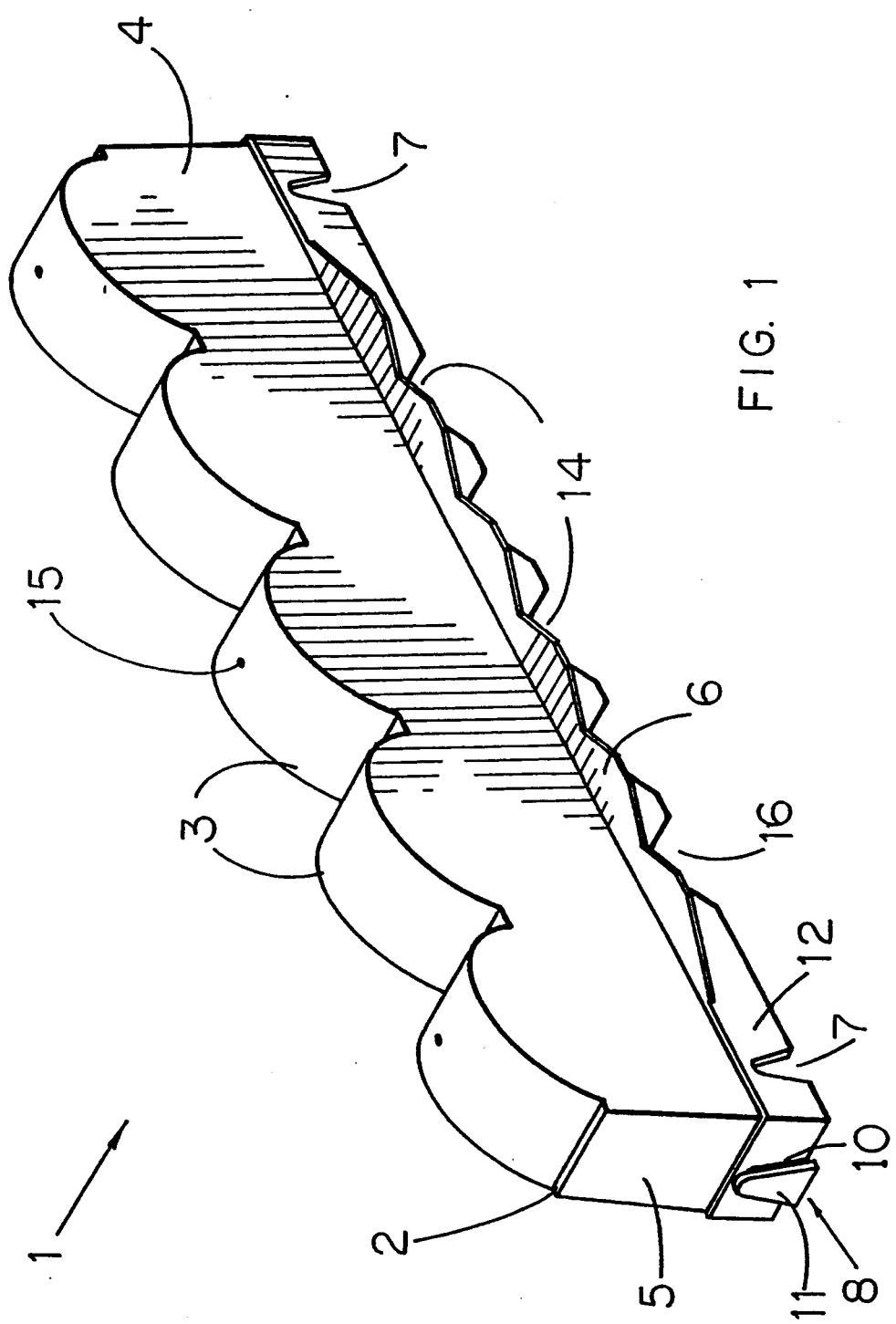
FIG. 1 is an isometric view of a straight module depicting the upper wall.

A straight module of the present invention as shown in FIG. 1 is injection molded using high impact thermoplastics such as polyproplene or polyethyene with sufficient amounts of ultra-violet stabilizing agents and colorants.

A typical module has a height of about five (5") to six (6") inches, width of about two (2") inches, and lengths from eighteen (18") to forty (40") inches. Depicted in FIG. 1 and FIG. 2, the length of this example is about twenty four inches (24"), and typical wall thickness is about one hundred thousandth (0.100") of an inch. In the case of curved modules of FIG. 5, the linear length of the a ninety degree (90°) arc is referred to as their lengths. Furthermore, the length of the curved modules are dictated by the radii of their arcs.

For simplicity, a Straight module is described in more detail. The module forms a narrow box with five walls and an open face. The upper wall consists of multiplicity of flat surfaces 2 and cylindrical surfaces 3 and is bounded by four generally vertical walls. Side walls 4 run along the longest dimension of the module and are attached to stabilizing flanges 6. End walls 5, generally define the termination surfaces of the modules.

Figure 2:
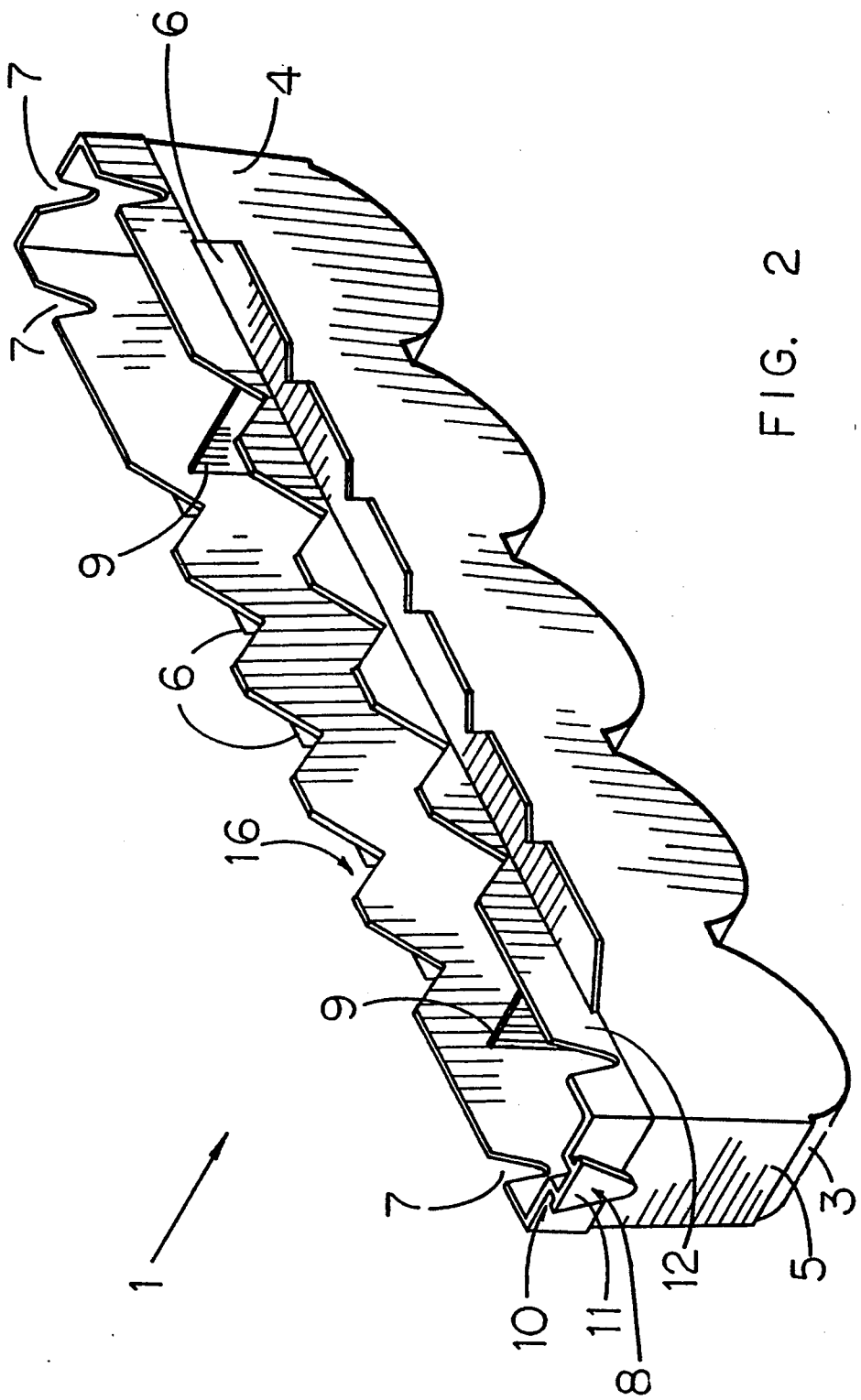
FIG. 2 is an isometric view of a straight module depicting the open face and internal walls.
Figure 3:
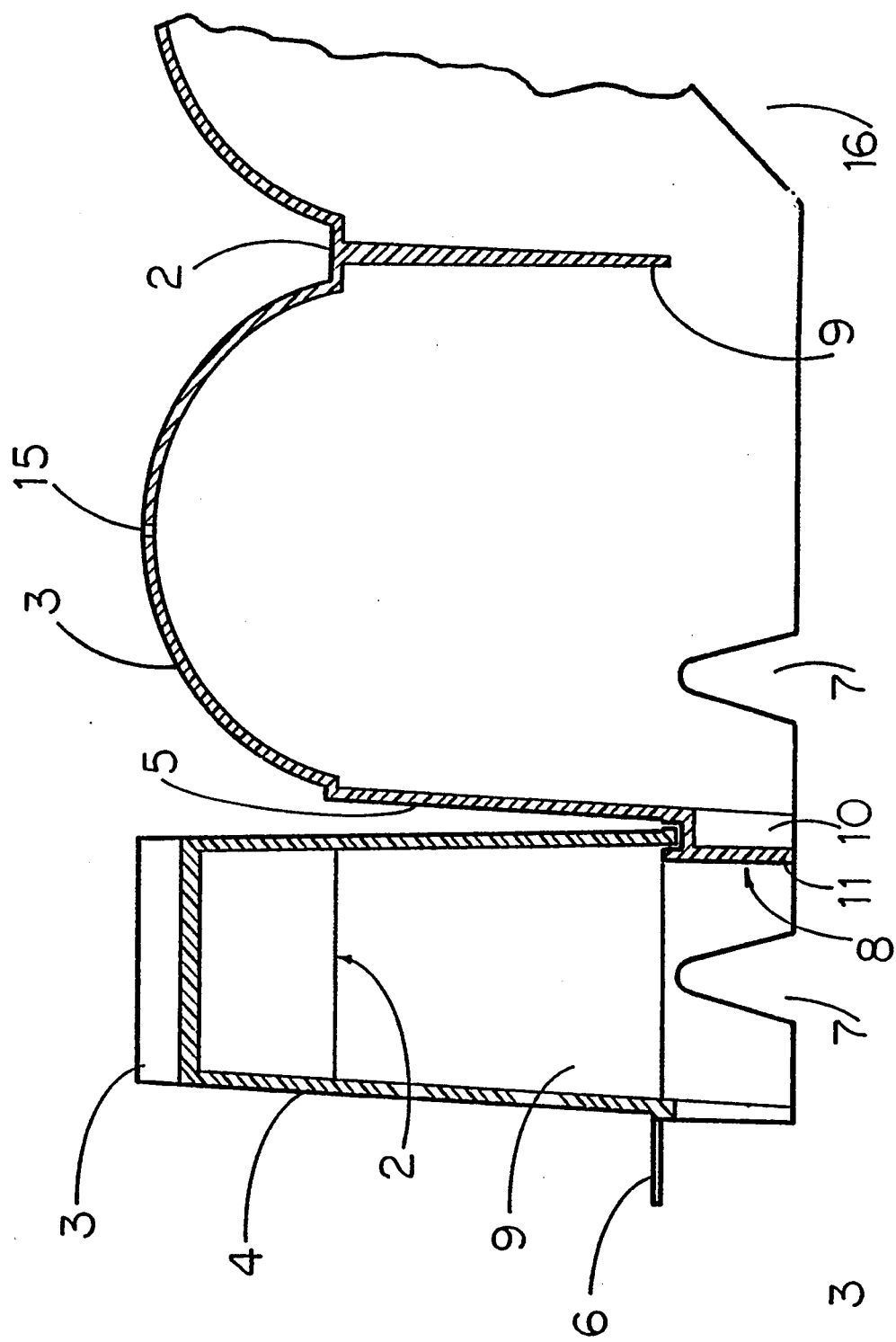
FIG. 3 is a longitudinal and lateral cross-section of two straight modules, depicting the interlocking mechanism of the connectors.

Internal walls 9, are formed generally vertically between side walls 4, and the flat surfaces 2 of the upper wall as shown in FIGS. 2, 3, and 4.

Male connectors 8 are located at the lowest portion of at least one of the end walls, while female connectors are located in the same general axial direction at locations such as the end walls and extreme ends of the side walls 12. This arrangement makes it possible to construct the modules so that different geometrical boundary shapes are practical.

Each female connection 7 is in the shape of equilateral triangular slot with its equal sides positioned generally vertically and conforming to those of the male connectors 8. The top angle of the slot is changed from a sharp corner to a rounded corner 13.

Each male connector is made of a triangular prism 10 of the same dimensions of those of female connectors 7 and thickness of more than that of general modules wall thickness, and an end cap triangular plate 11 which has slightly larger dimensions that those of the prisms.

Stabilizing flanges are generally parallel to the longitudinal axis of the modules but do not run along the full length of the module, leaving gaps 12 to facilitate connector interlocking. It is possible to mold the modules so that slots 14 are formed in the flanges, saving on material and production costs. The thickness of the flange can be as little as sixty percent (60%) of the modules wall thickness.

This invention is intended to save on shipping weight and shipping volume. Typical weight of a two foot module is about six percent (6%) of that of a concrete device of the same general dimensions. This saving of weight is the due to lower specific gravity of aforementioned plastics in comparison with concrete and this invention's feature of being molded as a hollow box. The volume savings are brought about by the feature of high draft angle used on all generally vertical walls so that when stacked as shown in FIG. 4 one is inserted into the other, and the total volume of the two is less than that of two non-inserting modules. The height of the internal walls 9 must be at least one half or more times the height of the module itself to insure ease of separation of the modules. This arrangement distributes the weight of the module on the top only over the flat surfaces 2 of the lower module which in turn transfer it to the internal walls of the lower module. Using this method it is intended to stack-insert several modules to utilize the shipping volume more efficiently. Shorter internal walls result in wall to wall contact of the modules and their subsequent scratch marks.

A typical module is inserted into the soil by means of first digging a trench that is about two inches deep and three inches wide and as long as the boundary of the edging is desired. Then the modules are simply laid in the trench with their open face down and their connectors interlocking. Finally loose soil or tree bark is used to bury the lower portions of the modules including flanges 6.

When water is absorbed by the soil, air and possibly steam are released from the portion of the soil under each module. These gases are then entrapped under the cavity formed by each module and tend to loosen the modules due to their buoyancy forces from the soil; for this reason, this invention features air release holes 15 located in the upper walls 2 and 3.

The cylindrical surfaces 3 of the upper wall are intended as ornamental designs and if they are molded flat in accordance to surfaces 2, the utility of this invention is not affected.

Flanges 6 are intended to provide additional longitudinal stiffness to the modules; and to restrict mechanical movement when buried under about at least one inch of soil. The slots 13 should not be so deep so that the stiffening effects of the flanges are diminished. These flanges also insure preservation of the modules longitudinal shape such as straight or curved; without them their wall thickness would have to be increased to preserve the same shape.

The triangular slots which form the female connectors 7 are given a round upper corners 13 to reduce the possibility of high internal stress concentration and the resultant failure of the material. This feature also avoids unnecessary wear of the injection molding tools.

The male connectors 8 are designed so that their triangular prism 10 fits loosely inside the female connectors 7. The thickness of prisms is more than that of typical module wall thickness to avoid possible jamming of the connectors, transfer of mechanical shocks from one module to another, and formation of cracks due to thermal expansion. Triangular shape is featured in this invention because it is relatively simpler to tool, and due to built-in slopes, less dirt may be trapped between the connectors while interlocking in soil. The end plate 11 restricts the play between the connectors in the horizontal plane, yet the modules vertical play is restricted by the flanges 6.

Triangular slots 16 may be removed from the bottom of the side walls 4 to reduce the amount of plastic needed to mold the device, and to reduce the force needed to insert it into the soil.

What is claimed is:

1. A molded plastic landscape edging module adapted to be joined with other modules to form a landscape border, said module comprising:
   (a) an elongated, hollow body having two opposed ends;
   (b) a female connector comprising a generally triangular slot formed in one end of said hollow body;
   (c) a male connector comprising a generally triangular projection formed in an opposing end of having a channel formed therein the hollow body for interlocking with the female connector in an opposed end of another module to join the modules in end-to-end relationship; and
   (d) at least one longitudinal stabilizing flange extending outwardly from said hollow body generally parallel to the ground for stabilizing the module when the module is inserted into the ground.

2. The landscape edging module of claim 1 further including a second female connector formed in a side of the hollow body for engaging the male connector of another module such that the modules joined are disposed at 90° with respect to one another.

3. The landscape edging module of claim 1 including at least two stabilizing flanges extending from opposing sides of the hollow body.

4. The landscape edging module of claim 3 further including a series of triangular slots formed along a bottom of the hollow body to facilitate insertion of the hollow body into the ground.

5. The landscape edging module of claim 1 further including at least one air release hole formed in a top of the hollow body for venting gases trapped inside said hollow body.

6. A molded plastic landscape edging module adapted to be joined with other modules to form a landscape border, said module comprising:
   a) a hollow body made of a plastic material including two generally parallel side walls, two end walls connecting said side walls, a closed top, and an open bottom;
   b) at least one longitudinal stabilizing flange extending outwardly from one of the side walls, said flange spaced a predetermined distance above a bottom edge of the side wall;
   a female connector formed in one end wall of the hollow body, said female connector being disposed entirely below said longitudinal stabilizing flange; and
   d) a male connector formed in the opposing end wall of the hollow body for engaging with the female connector in the opposed end of another module to join the modules in end-to-end relationship, said male connector being disposed entirely below said longitudinal stabilizing flange.

7. The landscape edging module of claim 6 wherein the female connector and the male connector each have a generally triangular configuration.

8. The landscape edging module of claim 6 including at least two stabilizing flanges projecting outwardly from opposing side walls each flange positioned on the edging module above the connectors.

9. The landscape edging module of claim 8 further including a series of triangular slots formed along a bottom edge of said side walls to facilitate insertion of the hollow body into the ground.

10. The landscape edging module of claim 6 further including at least one air release hole formed in the top of the hollow body for venting gases trapped inside said hollow body.

11. The landscape edging module of claim 6 further including a second female connector formed in a side wall for engaging the male connector of another module such that the modules joined are disposed at 90° with respect to one another.

12. A molded plastic landscape edging module adapted to be joined with other modules to form a landscape border, said module comprising:
   (a) a hollow body made of a plastic material including two generally parallel side walls, two end walls connecting said side walls, a closed top, and an open bottom;
   (b) a generally triangular female connector formed in one end wall of the hollow body, said female connector comprising a notch extending vertically from a bottom edge of the end wall;
   (c) a generally triangular male connector formed in the opposing end wall of the hollow body for engaging with the female connector in the opposed end of another module to join the modules in end-to-end relationship, wherein said male connector comprises a projection having a channel therein for interlocking with the edges of the notch of the female connector, said male and female connector being interlocked by inserting the male connector vertically into the female connector; and (d) a pair of longitudinal stabilizing flanges projecting outwardly from opposing side walls of the hollow body for stabilizing the module when the module is inserted into the ground.

13. The landscape edging module of claim 12 further including a series of triangular slots formed along a bottom edge of said side walls to facilitate insertion of the hollow body into the ground.

14. The landscape edging module of claim 12 further including at least one air release hole formed in the top of the hollow body for venting gases trapped inside said hollow body.

15. A molded plastic landscape edging module adapted to be joined with other modules to form a landscape border, the module comprising:

a) an elongated hollow body made of plastic material, including two generally parallel side walls and two end walls connecting the side walls;

b) a female connector formed in one end wall of the hollow body;

c) a male connector formed in the other end wall of the hollow body for engaging with a female connector in an end wall of another module to join the modules in an end-to-end relationship; and d) a second female connector formed in one of the side walls of the hollow body for engaging a male connector of another module such that the modules joined at the second female connector are disposed at 90° with respect to one another.

* * * * *